(12) United States Patent
Mori

(10) Patent No.: US 11,295,478 B2
(45) Date of Patent: Apr. 5, 2022

(54) STEREO CAMERA CALIBRATION METHOD AND IMAGE PROCESSING DEVICE FOR STEREO CAMERA

(71) Applicant: OLYMPUS CORPORATION, Hachioji (JP)

(72) Inventor: Junichi Mori, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 177 days.

(21) Appl. No.: 16/852,683

(22) Filed: Apr. 20, 2020

(65) Prior Publication Data

US 2020/0242806 A1    Jul. 30, 2020

Related U.S. Application Data

(63) Continuation of application No. PCT/JP2017/039142, filed on Oct. 30, 2017.

(51) Int. Cl.
*G06K 9/00* (2006.01)
*G06T 7/80* (2017.01)
*H04N 13/246* (2018.01)

(52) U.S. Cl.
CPC .............. *G06T 7/85* (2017.01); *H04N 13/246* (2018.05)

(58) Field of Classification Search
CPC .............. G06T 7/85; G06T 2207/10012; G06T 7/593; G06T 2207/10021; H04N 13/246;
(Continued)

(56) References Cited

U.S. PATENT DOCUMENTS

| 5,119,178 A | 6/1992 | Sakata et al. |
| 6,768,509 B1 | 7/2004 | Bradski et al. |

(Continued)

FOREIGN PATENT DOCUMENTS

| JP | H03214990 A | 9/1991 |
| JP | H08285534 A | 11/1996 |

(Continued)

OTHER PUBLICATIONS

International Search Report (ISR) (and English translation thereof) dated Jan. 16, 2018 issued in International Application No. PCT/JP2017/039142.

(Continued)

*Primary Examiner* — Shervin K Nakhjavan
(74) *Attorney, Agent, or Firm* — Holtz, Holtz & Volek PC

(57) ABSTRACT

A stereo camera calibration method includes: obtaining a stereo image generated by imaging a chart using a stereo camera, the chart at least including two markers arranged at a known interval; measuring the known interval, using the stereo image and a calibration parameter for the stereo camera; and correcting a parameter pertaining to an optical axis position so as to reduce a difference between the known interval and a result of the measurement. The correcting includes performing a process corresponding to moving the optical axis position in perpendicular and lateral directions on an imaging surface of the stereo camera. The correcting includes calculating a perpendicular correction amount of the optical axis position, and then calculating a lateral correction amount of the optical axis position.

10 Claims, 14 Drawing Sheets

(58) Field of Classification Search
CPC .............. H04N 13/239; H04N 13/204; H04N 13/327; B25J 9/1697; G03B 35/08; G03B 15/00; G03B 43/00; G01C 11/06; G01C 3/085; G02B 2027/0138; G02B 30/34; G05B 2219/40564; G06F 3/0304

See application file for complete search history.

(56) References Cited

U.S. PATENT DOCUMENTS

| | | | | |
|---|---|---|---|---|
| 7,659,921 | B2 * | 2/2010 | Aoyama | G06T 7/593 348/135 |
| 8,077,909 | B2 * | 12/2011 | Watanabe | H04N 5/33 382/100 |
| 2002/0113878 | A1 * | 8/2002 | Iwai | H04N 13/246 348/187 |
| 2009/0290786 | A1 * | 11/2009 | Stevens | G06T 7/593 382/154 |
| 2010/0232681 | A1 * | 9/2010 | Fujieda | G06K 9/00 382/154 |
| 2012/0105591 | A1 * | 5/2012 | Kim | H04N 17/002 348/46 |
| 2014/0118503 | A1 * | 5/2014 | Luo | H04N 13/246 348/47 |
| 2014/0125772 | A1 * | 5/2014 | Myokan | H04N 13/246 348/47 |
| 2015/0103147 | A1 * | 4/2015 | Ho | G06T 7/85 348/47 |
| 2016/0073092 | A1 * | 3/2016 | Lin | G06T 7/85 348/49 |
| 2016/0316192 | A1 * | 10/2016 | Kishiwada | H04N 13/239 |
| 2016/0353083 | A1 * | 12/2016 | Aoki | G06T 7/70 |
| 2017/0019656 | A1 * | 1/2017 | Liu | H04N 13/296 |
| 2019/0080466 | A1 | 3/2019 | Mori | |

FOREIGN PATENT DOCUMENTS

| | | |
|---|---|---|
| JP | 2003324749 A | 11/2003 |
| JP | 2009222446 A | 10/2009 |
| JP | 2012202694 A | 10/2012 |
| JP | 2013113600 A | 6/2013 |
| JP | 2015001465 A | 1/2015 |
| JP | 2017003279 A | 1/2017 |

OTHER PUBLICATIONS

Zhang, "A Flexible New Technique for Camera Calibration", IEEE Transactions on Pattern Analysis and Machine Intelligence, Nov. 2000, vol. 22, No. 11, pp. 1330-1334.

International Preliminary Report on Patentability (IPRP) dated May 14, 2020 issued in International Application No. PCT/JP2017/039142.

* cited by examiner

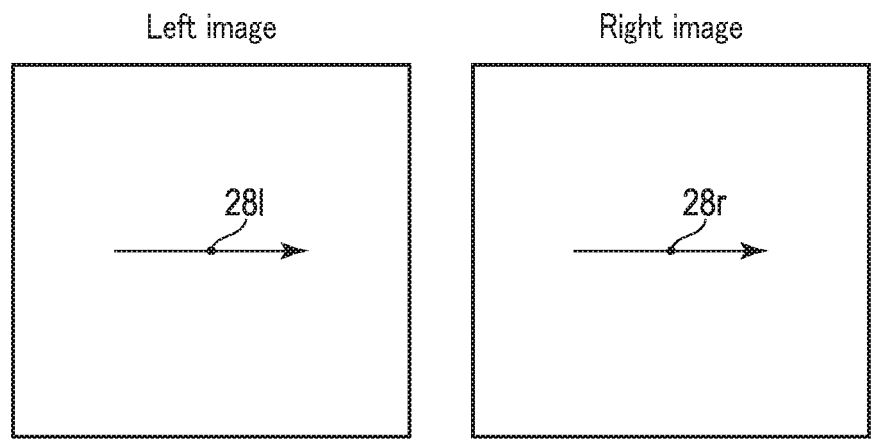
F I G. 19
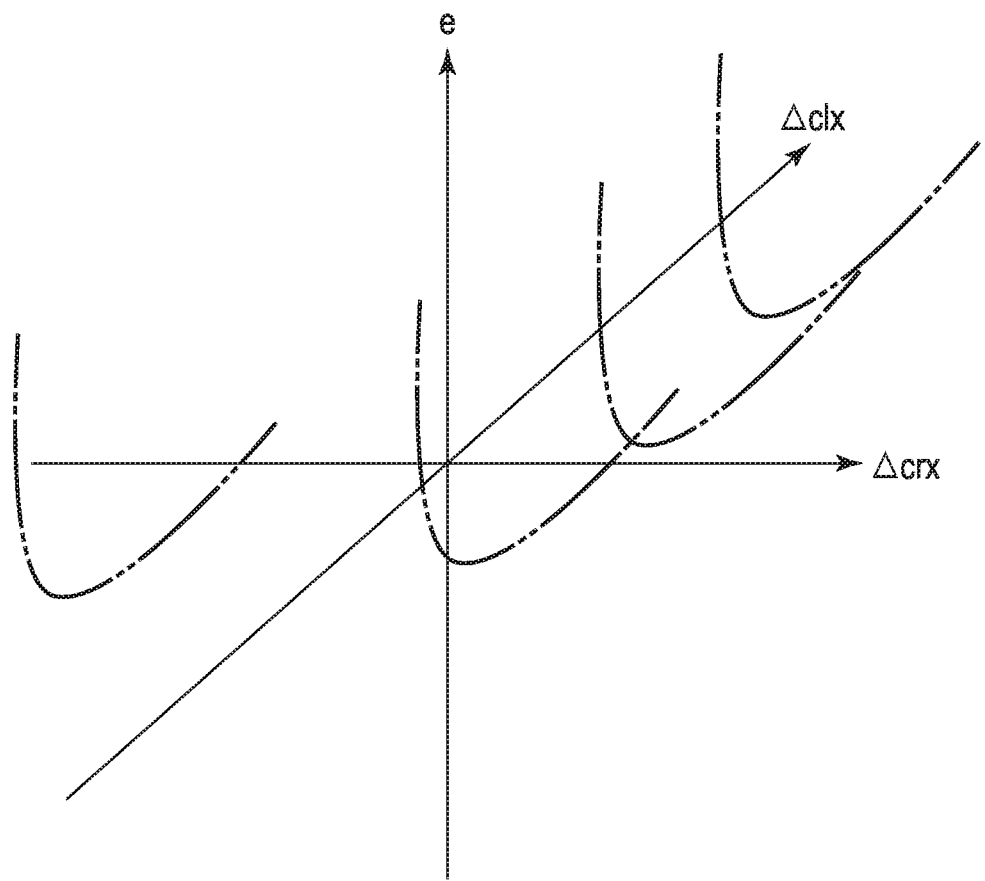
F I G. 20

STEREO CAMERA CALIBRATION METHOD AND IMAGE PROCESSING DEVICE FOR STEREO CAMERA

CROSS-REFERENCE TO RELATED APPLICATIONS

This application is a Continuation Application of PCT Application No. PCT/JP2017/039142, filed Oct. 30, 2017, the entire contents of which are incorporated herein by reference.

BACKGROUND OF THE INVENTION

1. Field of the Invention

The present invention relates to a stereo camera calibration method and an image processing device for a stereo camera.

2. Description of the Related Art

A stereo measurement technique has been known as one of object distance measurement techniques using an imaging device. The stereo measurement technique is a technique that simultaneously takes images in different views to obtain images, and calculates the three-dimensional position of the object, based on the triangulation principle, using the relative deviation amount in the images of the same object.

Accurately obtaining the position of the object requires preliminarily storing of intrinsic parameters that indicate optical characteristics, such as the focal length, the optical axis position, and the distortion, and extrinsic parameters that indicate geometrical arrangement information, such as the relative positions of left and right optical systems. A step of calculating parameters required for the stereo measurement is called calibration. A method of estimating the intrinsic parameters and extrinsic parameters (hereinafter called calibration parameters) by taking images of a known chart pattern, has been known.

Even with individual differences due to production errors and the like at the time of shipment of stereo cameras, correct measurement results can be obtained by obtaining the calibration parameters through calibration irrespective of the individual differences. Meanwhile, in case the optical system characteristics and geometrical arrangement of left and right optical systems are temporally changed by being affected by physical impacts and change in expansion rate due to heat and humidity, the measurement accuracy is degraded.

Zhengyou Zhang, "A Flexible New Technique for Camera Calibration", IEEE TRANSACTIONS ON PATTERN ANALYSIS AND MACHINE INTELLIGENCE, VOL. 22, NO. 11, NOVEMBER 2000, 1330-1334 discloses a technique that takes images of a plane chart having a known pattern (a checker patterns, a grid patterns, or the like), and calculates the calibration parameters of a stereo camera using the relationship between the coordinate values of taken markers and geometrical information on the pattern.

Jpn. Pat. Appln. KOKAI Publication No. 2013-113600 discloses a technique that searches corresponding points between a reference image and a comparative image, and adopts, as the optimal position, the position having the maximum ratio of pixels where the corresponding point is found, thus performing correction in the perpendicular direction.

Jpn. Pat. Appln. KOKAI Publication No. 08-285534 discloses a technique that measures the interval of white lines that has a known dimension using the triangulation principle from a vehicle-mounted camera to thereby detect the deviation or the like in the installation direction of imaging means and notify a user, thus improving the reliability of results.

BRIEF SUMMARY OF THE INVENTION

A stereo camera calibration method according to the present invention includes: obtaining a stereo image generated by imaging a chart using a stereo camera, the chart at least including two markers arranged at a known interval; measuring the known interval, using the stereo image and a calibration parameter for the stereo camera; and correcting a parameter pertaining to an optical axis position and included in the calibration parameter so as to reduce a measurement error that is a difference between the known interval and a result of the measurement. The correcting the parameter pertaining to the optical axis position includes performing a process corresponding to moving the optical axis position in perpendicular and lateral directions on an imaging surface of the stereo camera. The correcting the parameter pertaining to the optical axis position includes calculating a perpendicular correction amount of the optical axis position first, and subsequently calculating a lateral correction amount of the optical axis position.

Advantages of the invention will be set forth in the description that follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 19 schematically shows lateral correction amount calculation processes shown in FIG. 16 and FIG. 17.

FIG. 20 graphically illustrates the lateral correction amount calculation processes shown in FIG. 16 and FIG. 17.

DETAILED DESCRIPTION OF THE INVENTION

[Overall Configuration of Device]

Figure 1:
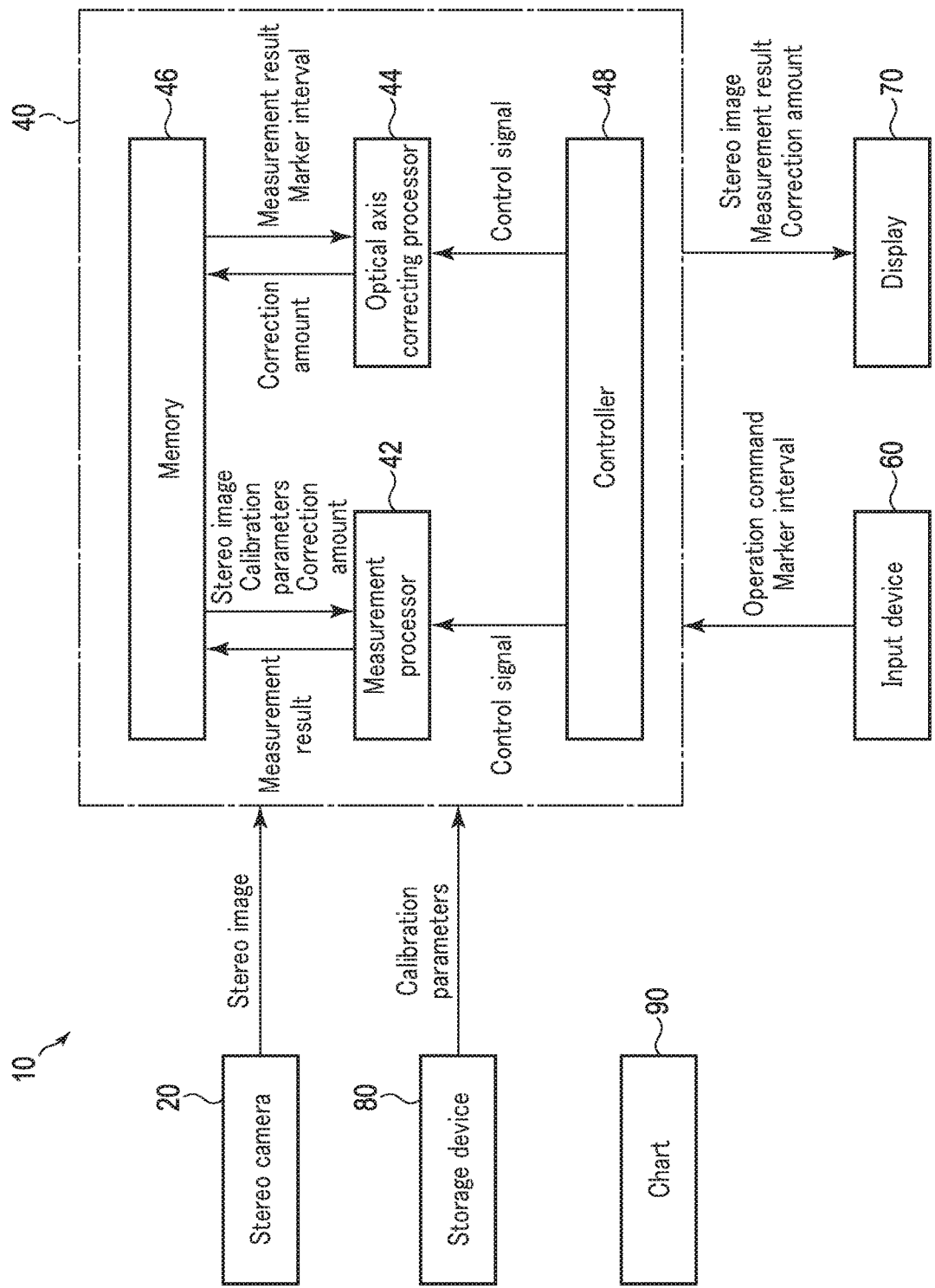
FIG. 1 shows an overall configuration of a stereo measurement device according to an embodiment of the present invention.

Hereinafter, referring to the drawings, embodiments are described. FIG. 1 shows an overall configuration of a stereo measurement device 10 according to this embodiment.

The stereo measurement device 10 is a device that obtains a relative deviation amount of feature points of the same object in images from a right image and a left image that have been taken in different views, and calculates the three-dimensional position of the feature points of the object based on the triangulation principle, thereby measuring the dimensions of the object and the like. The stereo measurement device 10 may be mounted on a 3D endoscope, for example.

The stereo measurement device 10 comprises: a stereo camera 20 configured to generate a stereo image; an image processing device 40 configured to process the stereo image generated by the stereo camera 20; an input device 60 configured to allow a user to operate the stereo measurement device 10; a display 70 configured to output various types of information supplied from the image processing device 40; and a storage device 80 configured to store calibration parameters of the stereo camera 20.

The stereo camera 20 is configured to image an object simultaneously in different directions to thereby generate a stereo image that includes images mutually having a parallax. The stereo camera 20 includes, for example, a single imaging sensor to generate images. In this case, imaging areas are set on a light receiving surface of the single imaging sensor, and the images are generated from output signals of pluralities of pixels in the imaging areas, respectively. However, without limitation thereto, the stereo camera 20 may include imaging sensors. In this case, for example, images are generated from output signals of the respective imaging sensors. In this embodiment, the stereo camera 20 is configured to generate a stereo image that includes two images having a parallax in the lateral direction.

The image processing device 40 is configured to obtain the stereo image from the stereo camera 20, and process the obtained stereo image.

The input device 60 and the display 70 cooperate with software to constitute a user interface that allows information to be exchanged between the stereo measurement device 10 and the user.

The input device 60 is a device that allows a user to input various types of operation commands indicating activation and stop, measurement start, and the like of the stereo measurement device 10, and various types of information on a marker interval and the like. The input device 60 comprises, for example, a mouse or a keyboard that constitutes a graphical user interface through cooperation with the display 70. Alternatively, the input device 60 may comprise a touch panel that is per se a graphical user interface. Alternatively, the input device 60 may comprise a keyboard that has keys and buttons dedicated to various operation commands.

The display 70 has a display function of displaying images, characters, and the like. The display 70 outputs information through display. The display 70 may have an audio output function of outputting audio as well as the display function. The display 70 may output information through combined use of display and audio output, or through audio output instead of display.

The storage device 80 stores preset calibration parameters of the stereo camera 20. The calibration parameters include, for example, intrinsic parameters, extrinsic parameters, and distortion coefficients. The intrinsic parameters include, for example, the optical center, the focal length, and the shear modulus of the stereo camera 20. The extrinsic parameters include, for example, the three-dimensional position and orientation (=rotation) of the stereo camera 20. The calibration parameters stored in the storage device 80 are preset at the time of manufacture of the stereo measurement device 10.

The image processing device 40 comprises: a measurement processor 42 configured to perform a measurement process; an optical axis correcting processor 44 configured to perform an optical axis correcting process; a memory 46 configured to store various types of information; and a controller 48 configured to control the measurement processor 42, the optical axis correcting processor 44, and the memory 46.

The measurement processor 42, the optical axis correcting processor 44, and the controller 48 are collectively constituted by a processor, for example. However, without limitation thereto, the measurement processor 42, the optical axis correcting processor 44, and the controller 48 may be collectively constituted by processors. For example, the measurement processor 42, the optical axis correcting processor 44, and the controller 48 may be constituted by a dedicated hardware processor configured using an ASIC, an FPGA or the like. Alternatively, the measurement processor 42, the optical axis correcting processor 44, and the controller 48 may be constituted by a combination of general-purpose hardware, such as a CPU, and software.

The controller 48 is configured to control also the stereo camera 20, the input device 60, the display 70, and the storage device 80 as well as the measurement processor 42, the optical axis correcting processor 44, and the memory 46. That is, the controller 48 is configured to control the stereo measurement device 10 integrally, in response to an operation command input through the input device 60.

The controller 48 is configured to output, to the display 70, information instructing the user to use the stereo camera 20 to image a chart 90 for calibrating the stereo camera 20, and to cause the display 70 to display the instruction information, at the start of using the stereo measurement device 10, that is, at the activation.

The controller 48 is also configured to obtain the stereo image from the stereo camera 20, and cause the memory 46 to store the obtained stereo image.

The controller 48 is further configured to obtain the calibration parameters from the storage device 80, and cause the memory 46 to store the obtained calibration parameters.

The optical axis correcting processor 44 is configured to be subjected to control by the controller 48, and read the measurement results and the marker interval from the memory 46, and correct parameters pertaining to the optical axis position of the optical systems of the stereo camera 20 using the read measurement results, during calibration. The optical axis correcting processor 44 is further configured to cause the memory 46 to store a correction amount.

The measurement processor 42 is configured to be subjected to control by the controller 48, read the stereo image, the calibration parameters, and the correction amount from the memory 46, and perform three-dimensional measurement using the read stereo image, calibration parameters, and correction amount. Note that the correction amount is set to zero at the initial state. The measurement processor 42 is also configured to cause the memory 46 to store the measurement results.

The controller 48 is also configured to read the stereo image, the correction amount, and the measurement results from the memory 46 as required, and cause the display 70 to display the stereo image, the correction amount, and the measurement results, which have been read as required.

[Stereo Camera]

As described above, the stereo camera 20 is configured to generate a stereo image that includes two images (a right image and a left image) having a parallax in the lateral direction. Accordingly, the stereo camera 20 includes substantially two imaging systems laterally arranged at an interval. Each imaging system comprises an optical system configured to generate an optical image, and an image sensor configured to convert the optical image into an electric signal to generate an image.

Figure 2:
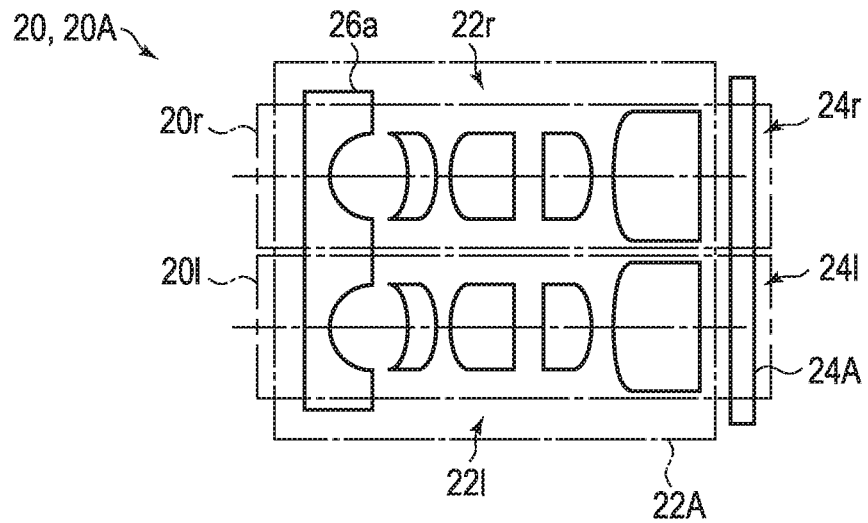
FIG. 2 schematically shows a configuration example of a stereo camera shown in FIG. 1.

FIG. 2 schematically shows a configuration example of the stereo camera 20. A stereo camera 20A shown in FIG. 2 comprises: an optical system 22A configured to generate a pair of optical images (a right optical image and a left optical image) having a parallax in the lateral direction; and a single imaging sensor 24A configured to convert the pair of optical images into electric image signals, and generate a pair of images (a right image and a left image).

The imaging sensor 24A includes a left imaging area 24*l* including a plurality of pixels configured to photoelectrically convert the left optical image to generate the left image, and a right imaging area 24*r* including a plurality of pixels configured to photoelectrically convert the right optical image to generate the right image. A part of the optical system 22A, and a part of the imaging sensor 24A that includes the left imaging area 24*l* constitute a left imaging system 20*l* configured to generate the left image. Another part of the optical system 22A, and another part of the imaging sensor 24A that includes the right imaging area 24*r* constitute a right imaging system 20*r* configured to generate the right image.

The optical system 22A comprises lenses. The lenses include a lens 26*a* included commonly in the left imaging system 20*l* and the right imaging system 20*r*.

In the stereo camera 20 of this configuration example, a stereo image, that is, a left image and a right image, are respectively generated from output signals of the pluralities of pixels in the left imaging area 24*l* and the right imaging area 24*r* of the single imaging sensor 24A.

In the following description a part of the optical system 22A that is included in the left imaging system 20*l* is called a left optical system 22*l*, and a part of the optical system 22A that is included in the right imaging system 20*r* is called a right optical system 22*r*. Furthermore, the left imaging system 20*l* and the right imaging system 20*r* are also, collectively called left and right imaging systems 20*l* and 20*r*. Likewise, the left optical system 22*l* and the right optical system 22*r* are also, collectively called left and right optical systems 22*l* and 22*r*. The left imaging area 24*l* and the right imaging area 24*r* are also, collectively called left and right imaging areas 24*l* and 24*r*.

Figure 3:
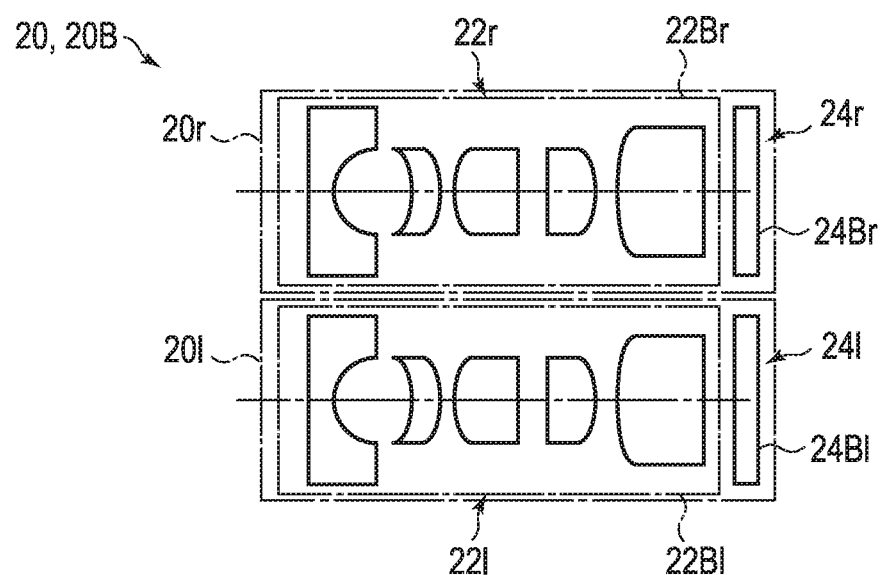
FIG. 3 schematically shows another configuration example of the stereo camera shown in FIG. 1.

FIG. 3 schematically shows another configuration example of the stereo camera 20. The stereo camera 20B shown in FIG. 3 comprises: a left optical system 22B*l* configured to generate a left optical image; a left imaging sensor 24B*l* configured to photoelectrically convert the left optical image to generate a left image; a right optical system 22B*r* configured to generate a right optical image; and a right imaging sensor 24B*r* configured to photoelectrically convert the right optical image to generate a right image.

The left optical system 22B*l* and the left imaging sensor 24B*l* constitute the left imaging system 20*l* configured to generate the left image. The right optical system 22B*r* and the right imaging sensor 24B*r* constitute the right imaging system 20*r* configured to generate the right image. That is, the left optical system 22B*l* per se constitutes the left optical system 22*l* of the left imaging system 20*l*. The right optical system 22B*r* per se constitutes the right optical system 22*r* of the right imaging system 20*r*.

The left imaging sensor 24B*l* includes the left imaging area 24*l* including a plurality of pixels configured to photoelectrically convert the left optical image to generate the left image. The right imaging sensor 24B*r* includes the right imaging area 24*r* including a plurality of pixels configured to photoelectrically convert the right optical image to generate the right image.

In the stereo camera 20 of this configuration example, the stereo image, that is, the left image and the right image, are generated from output signals of the left imaging sensor 24B*l* and the right imaging sensor 24B*r*, respectively.

In comparison between the stereo camera 20A shown in FIG. 2 and the stereo camera 20B shown in FIG. 3, since the stereo camera 20A includes the single imaging sensor 24A, and the left and right optical systems 22*l* and 22*r* share the single lens 26*a*, in comparison with the stereo camera 20B, the stereo camera 20A is resistant to occurrence of a temporal deviation between the left and right imaging systems 20*l* and 20*r*, and is regarded to have a desirable configuration.

[Temporal Deviation of Stereo Camera and Adverse Effects]

In the stereo measurement device 10, the optical axis deviation of each optical system of the stereo camera 20 is a main factor of causing a measurement error.

Figure 4:
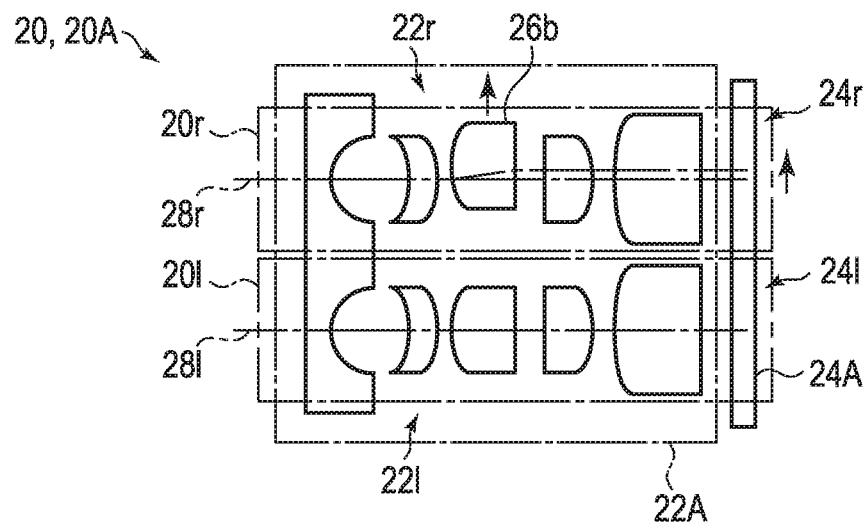
FIG. 4 shows a situation where an optical axis deviation is caused by movement of a lens in the stereo camera of the configuration example shown in FIG. 2.

FIG. 4 shows a situation where the optical axis deviation is caused by movement of the lens 26b in the optical system 22A in the stereo camera 20A shown in FIG. 2. As shown in FIG. 4, if the lens 26b of the right optical system 22r of the right imaging system 20r moves in the right direction, the optical axis 28r of the right optical system 22r of the right imaging system 20r moves in the right direction accordingly. On the contrary, if the lens 26b moves in the left direction, the optical axis 28r of the right optical system 22r of the right imaging system 20r moves in the left direction accordingly. If the lens 26b moves in the perpendicular direction, the optical axis 28r of the right optical system 22r of the right imaging system 20r moves in the perpendicular direction accordingly. This similarly applies to the stereo camera 20B shown in FIG. 3.

Figure 5:
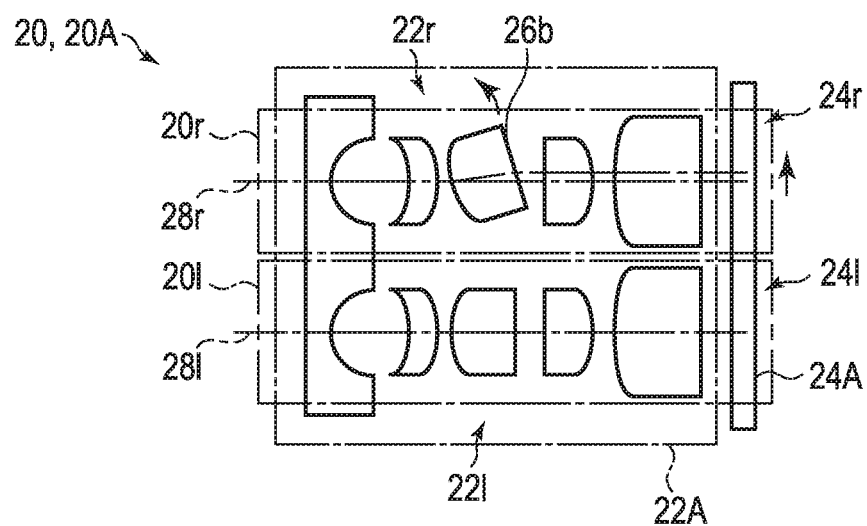
FIG. 5 shows a situation where an optical axis deviation is caused by rotation of a lens in the stereo camera of the configuration example shown in FIG. 2.

FIG. 5 shows a situation where an optical axis deviation is caused by rotation of the lens 22b of the optical system 22A in the stereo camera 20A shown in FIG. 2. As shown in FIG. 5, if the lens 26b of the right optical system 22r of the right imaging system 20r rotates counterclockwise viewed from the above, the optical axis 28r of the right optical system 22r of the right imaging system 20r moves in the right direction accordingly. On the contrary, if the lens 26b rotates clockwise viewed from the above, the optical axis 28r of the right optical system 22r of the right imaging system 20r moves in the left direction accordingly. If the lens 26b rotates counterclockwise and clockwise viewed from the left, the optical axis 28r of the right optical system 22r of the right imaging system 20r moves in the perpendicular direction accordingly. This similarly applies to the stereo camera 20B shown in FIG. 3.

Such translation of the optical axes 28r and 28l of the left and right optical systems 22l and 22r of the left and right imaging systems 20l and 20r can be corrected by the optical axis correcting process in this embodiment.

Figure 6:
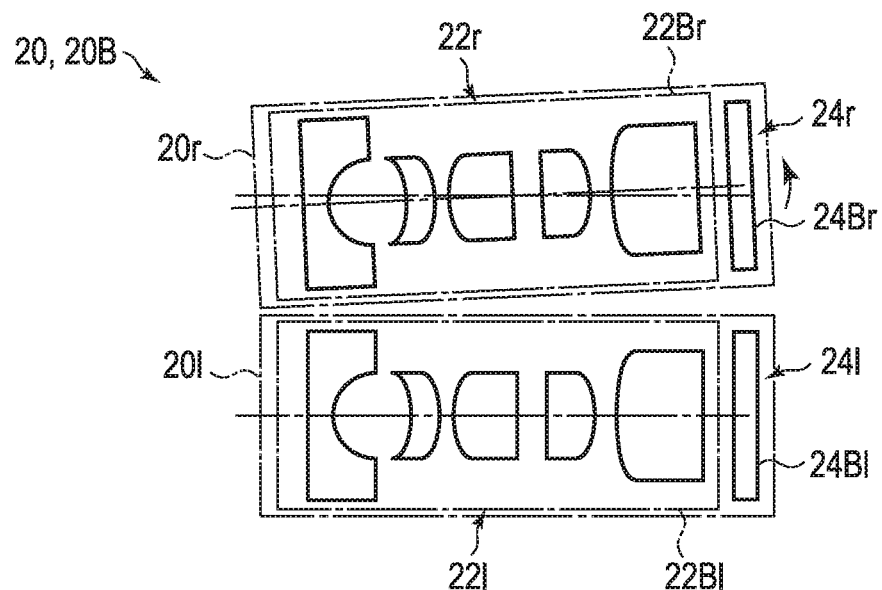
FIG. 6 shows a situation where the orientation of a right imaging system is changed in the stereo camera shown in FIG. 3.

FIG. 6 shows a situation where the overall orientation of the right imaging system 20r is changed with respect to the left imaging system 20l in the stereo camera 20B shown in FIG. 3. Specifically, FIG. 6 depicts a situation where the entire right imaging system 20r rotates counterclockwise viewed from the above with respect to the left imaging system 20l. Such relative change in orientations between the left and right imaging systems 20l and 20r is also a factor of causing a measurement error in the stereo measurement device 10.

To correct strictly such relative change in orientation between the left and right imaging systems 20l and 20r, the orientations of the left and right imaging systems 20l and 20r are required to be corrected. Note that if the change in the rotation angle and baseline length is small, optical axis correction can accommodate the change.

The stereo camera 20A shown in FIG. 2 does not cause such relative change in orientations between the left and right imaging systems 20l and 20r that causes the optical axes 28l and 28r of the left and right imaging systems 20l and 20r to be non-parallel.

Next, adverse effects of the temporal deviation are described. According to a design assumed for an endoscope, the adverse effect on the parallax is the largest. Optical axis deviation is the cause thereof. Consequently, if the optical axis deviation can be corrected, a practical measurement accuracy can be achieved.

[Chart]

The stereo measurement device 10 is configured to perform calibration at the activation in order to correct the deviation between the optical axes 28r and 28l of the left and right optical systems 22l and 22r of the left and right imaging systems 20l and 20r. The calibration is performed by imaging the chart 90. Accordingly, the stereo measurement device 10 instructs the user to image the chart 90 through the display 70, at the activation.

In the stereo measurement device 10 in this embodiment, the chart 90 is imaged, for example, freehand, i.e., in a state where a person holds the chart 90 with hands. This is performed in order to allow stereo measurement to be started quickly. It is a matter of course that the chart 90 may be imaged with the chart 90 being held using a retainer or the like in an optimal positional relationship with respect to the stereo camera 20. However, the stereo measurement device 10 in this embodiment does not require such a configuration. The chart 90 may be taken at least once. It is a matter of course that the chart 90 may be imaged more times.

The chart 90 includes markers arranged at known intervals. The chart 90 may include at least two markers. The markers may be intersections of grids or circles, for example. However, the markers are not limited thereto.

Figure 7:
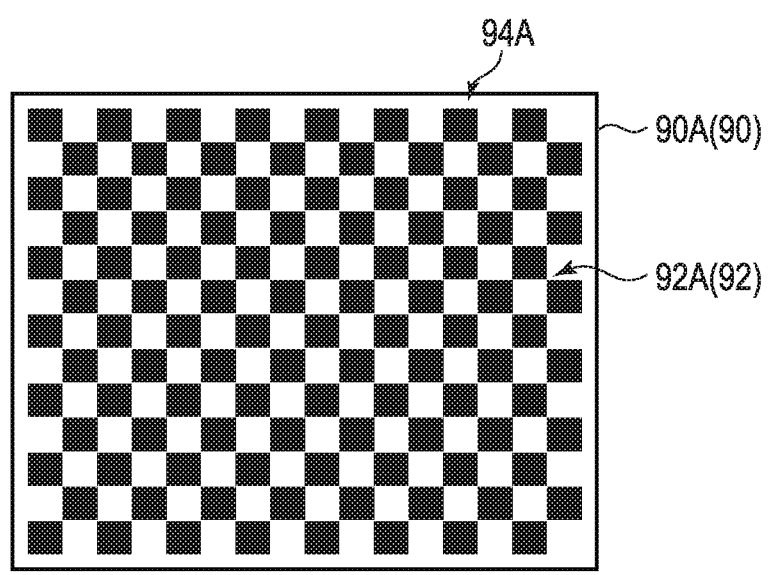
FIG. 7 shows an example of a chart for calibrating a stereo camera.

FIG. 7 shows the chart 90A for calibrating the stereo camera 20. The chart 90A includes a checker pattern 94A. The checker pattern 94A includes many white and black squares (checkers) arranged alternately in the perpendicularly and laterally. Markers 92A are, for example, intersections of checkers of the checker pattern 94A, in other words, contact points of white or black squires positioned diagonally, and are arranged at known intervals.

Figure 8:
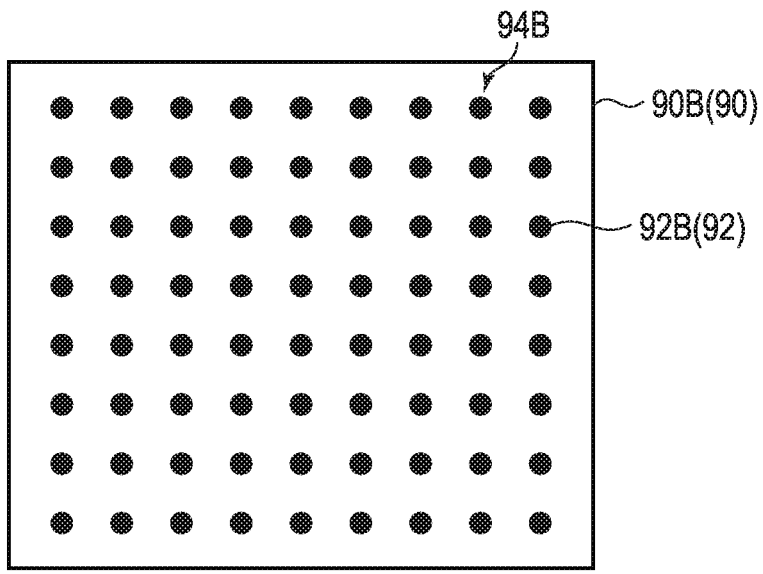
FIG. 8 shows another example of a chart for calibrating a stereo camera.

FIG. 8 shows another chart 90B for calibrating the stereo camera 20. The chart 90B includes a circle grid pattern 94B. The circle grid pattern 94B includes many black circle markers 92B arranged at the grid intersections. The markers 92B are arranged perpendicularly and laterally at constant intervals, for example. The interval of the markers 92B is only required to be known one, and is not necessarily constant.

Figure 9:
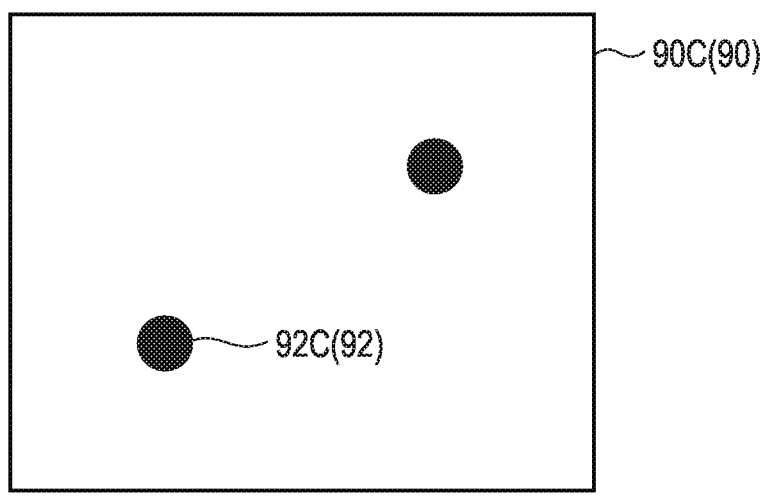
FIG. 9 shows still another example of a chart for calibrating a stereo camera.

FIG. 9 shows still another chart 90C for calibrating the stereo camera 20. The chart 90C includes only two markers 92C, which are black filled circles. The markers 92C are arranged at a known interval.

In the following description, the charts 90A, 90B, and 90C are collectively called the chart 90. The markers 92A, 92B, and 92C are collectively called the markers 92.

[Overview of Calibration Process]

Figure 10:
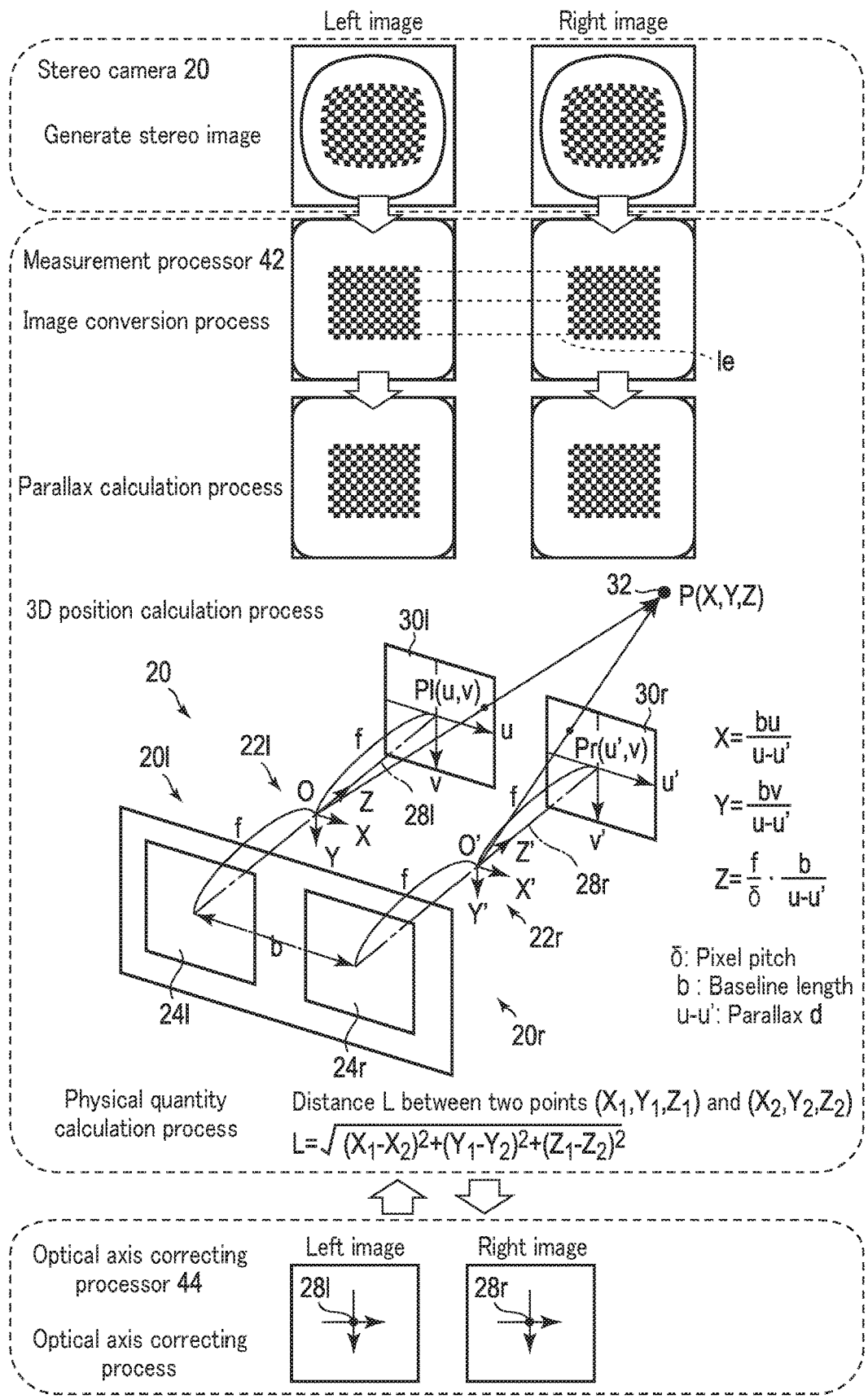
FIG. 10 shows an overview of a process of calibrating the stereo camera in the stereo measurement device shown in FIG. 1.

FIG. 10 shows an overview of the process of calibrating the stereo camera 20 in the stereo measurement device 10 shown in FIG. 1.

(1) The stereo image that is of the chart 90 including markers arranged at known intervals and has been generated by the stereo camera 20, i.e., the right image and the left image, are obtained. The stereo image is generated from output signals of the single imaging sensor 24 of the stereo camera 20A shown in FIG. 2, for example. Alternatively, the stereo image may be generated from output signals of the left imaging sensor 24Bl and the right imaging sensor 24Br of the stereo camera 20B shown in FIG. 3.

(2) In the measurement processor 42, an image conversion process, a parallax calculation process, a three-dimensional position calculation process, and a physical quantity calculation process are performed, thereby measuring the interval of markers (the distance between two points). The details of measurement of the interval of markers are described later with reference to FIG. 12.

(3) In the optical axis correcting processor 44, the optical axis position that reduces, preferably minimizes, a measurement error (the difference between an actual interval of markers (i.e., the known interval described above) and a measurement result of the interval of markers by the measurement processor 42) is searched, thereby calculating a correction amount. The details of correction amount calculation are described later.

[Measurement Processor]

The measurement processor 42 obtains the relative deviation amount of the same object in the right image and the left image taken in different views, and measures the dimensions and the like of the object based on the triangulation principle.

The measurement processor 42 performs a series of processes that include the image conversion process, the parallax calculation process, the three-dimensional position calculation process, and the physical quantity calculation process.

Figure 11:
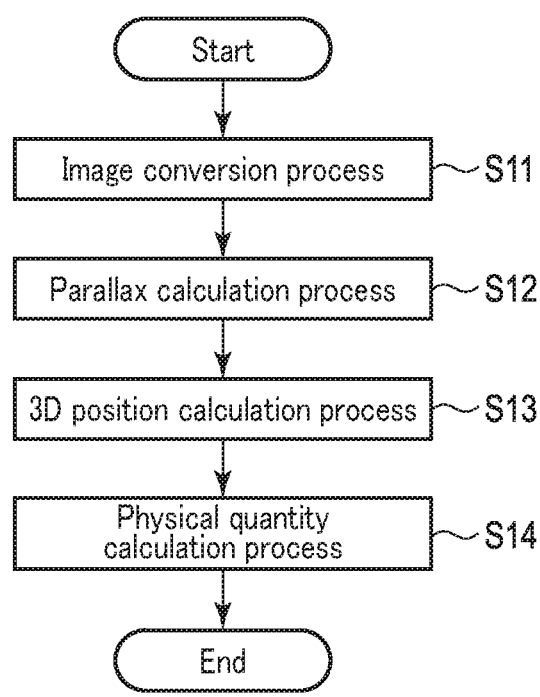
FIG. 11 shows a flow of processes performed by a measurement processor shown in FIG. 1.

FIG. 11 shows a flow of processes performed by the measurement processor 42.

<Step S11>

In step S11, the measurement processor 42 performs the image conversion process. The image conversion process includes distortion correction, and translation conversion.

The distortion correction is a process of correcting the adverse effect of the distortion due to the lens. Accordingly, the accuracy of the measurement is improved.

The translation conversion is a process that utilizes the limitation of positions where the same object is imaged due to the positional relationship between the right imaging system and the left imaging system (epipolar geometry), and performs conversion such that corresponding points are present (the epipolar lines le are parallel) through search in the lateral direction. The translation conversion can limit the search of the corresponding points in the lateral direction, and increases the processing speed.

In the stereo image generated by imaging the chart 90 held at hands of a person, typically, the epipolar lines le of the right image and the left image are non-parallel. This serves as a factor of complicating the measurement process and reducing the processing speed. The translation conversion is applied to such a stereo image having non-parallel epipolar lines le of the right image and the left image, thereby increasing the speed of processes thereafter.

<Step S12>

In step S12, the measurement processor 42 performs the parallax calculation process. The parallax calculation process is a process of calculating the difference of positions where the marker is imaged in the right image and the left image. To calculate the parallax, a method of using the similarity, such as ZNCC, or a method of using feature point (marker) detection can be utilized.

<Step S13>

In step S13, the measurement processor 42 performs the three-dimensional position calculation process. The three-dimensional position calculation process is a process of calculating the spatial position, that is, the three-dimensional position, of the object using the parallax, a stereo camera model, and calibration parameters.

<Step S14>

In step S14, the measurement processor 42 performs the physical quantity calculation process. The physical quantity calculation process is a process of calculating physical quantities, such as the dimension between two points (Euclidean distance), the area, or the like, using the calculated three-dimensional positions.

These processes are typical processes used in the stereo measurement technique.

[Stereo Camera Model]

Figure 12:
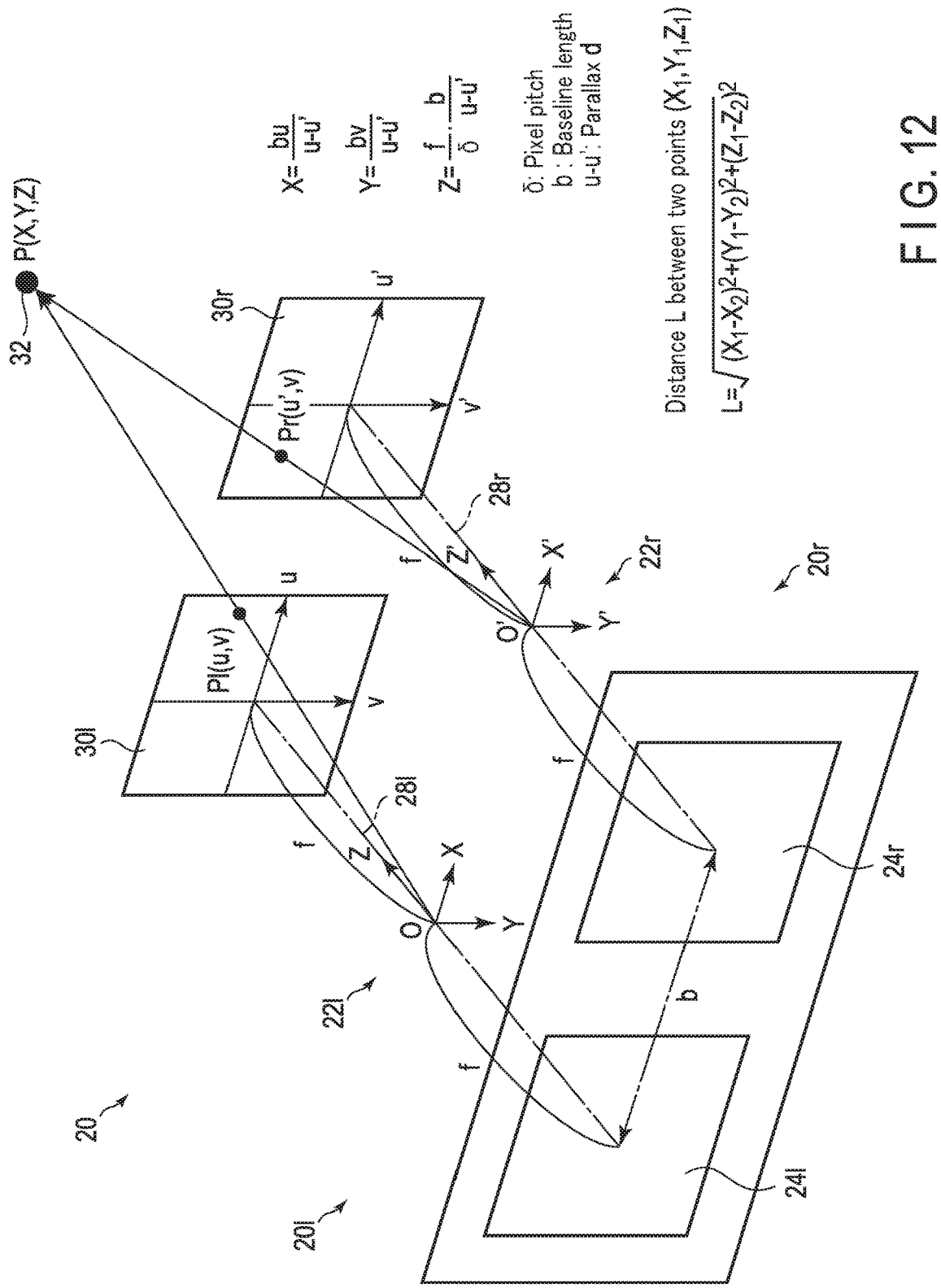
FIG. 12 shows an example of a stereo camera model.

FIG. 12 shows an example of a stereo camera model.

For the sake of simplicity, it is assumed that in the stereo camera model shown in FIG. 12, the orientations of the left and right imaging systems 20l and 20r of the stereo camera 20 are parallel to each other, and the lenses of the left and right optical systems 22l and 22r of the left and right imaging systems 20l and 20r have no distortion.

In FIG. 12, the left and right imaging systems 20l and 20r of the stereo camera 20 are configured to be substantially identical. The left and right optical systems 22l and 22r of the left and right imaging systems 20l and 20r have the same focal length f. An XYZ coordinate system is configured with the lens center O of the left optical system 22l being adopted as the origin. An X'Y'Z' coordinate system is configured with the lens center O' of the right optical system 22r being adopted as the origin.

The left and right imaging systems 20l and 20r are arranged in parallel to each other at an interval b in the lateral direction (i.e., along the X axis or X' axis). That is, the baseline length of the left and right imaging systems 20l and 20r, in other words, the distance between optical axes of the left and right optical systems 22l and 22r is b.

The left and right imaging areas 24l and 24r of the left and right imaging systems 20l and 20r are arranged so that their imaging surfaces are disposed on the back focal planes of the left and right optical systems 22l and 22r, respectively. On the front focal planes of the left and right optical systems 22l and 22r, virtual left and right projection imaging surfaces 30l and 30r are set, respectively. On the left projection imaging surface 30l, a uv orthogonal coordinate system is configured centered at the optical axis 28l of the left optical system 22l. On the right projection imaging surface 30r, a u'v' orthogonal coordinate system is configured centered at the optical axis 28r of the right optical system 22r.

The coordinates of the three-dimensional position of an object 32 in the XYZ coordinate system are assumed as P(X, Y, Z). The coordinates of the point in the uv orthogonal coordinate system where the line connecting the lens center O of the left optical system 22l and the three-dimensional position P(X, Y, Z) of the object 32 intersects with the left projection imaging surface 30l are assumed as Pl(u, v). Likewise, the coordinates of the point in the u'v' orthogonal coordinate system where the line connecting the lens center O' of the right optical system 22r and the three-dimensional position P(X, Y, Z) of the object 32 intersects with the right projection imaging surface 30r are assumed as Pr(u', v). Furthermore, the pixel pitch of the left and right imaging areas 24l and 24r is assumed as δ.

As described above, the measurement processor 42 calculates the three-dimensional position P(X, Y, Z) of the object 32 in the three-dimensional position calculation process. In the stereo camera model configured as described above, the parallax d between the left and right images is obtained by d=u−u'. Consequently, the XYZ coordinates of the three-dimensional position of the object 32 are respectively obtained by X=bu/(u−u')=bu/d, Y=bv/(u−u')=bv/d, Z=(f/δ)·{b/(u−u')}=fb/δd.

As described above, the measurement processor 42 calculates physical quantities, such as the dimension between two points (Euclidean distance), the area, and the like, in the physical quantity calculation process. For example, the distance L between a point $P_1(X_1, Y_1, Z_1)$ and a point $P_2(X_2, Y_2, Z_2)$ is obtained by $L=\{(X_1-X_2)^2+(Y_1-Y_2)^2+(Z_1-Z_2)^2\}^{1/2}$.

The measurement processor 42 causes the memory 46 to sore measurement results obtained by the series of processes that include the image conversion process, the parallax calculation process, the three-dimensional position calculation process, and the physical quantity calculation process.

[Measurement Process During Calibration]

During calibration, the object 32 is the markers 92 of the chart 90. The measurement processor 42 performs the image conversion process, the parallax calculation process, the three-dimensional position calculation process, and the physical quantity calculation process, described above, thereby measuring the interval of a pair of or pairs of markers 92. The measurement processor 42 causes the memory 46 to store the measurement result of the interval of the pair or pairs of markers 92.

As described above, any pair of markers 92 of the chart 90 is arranged at a known interval. Information on the known interval (the marker interval described above) is input through the input device 60, for example, and stored in the memory 46. In the following description, the information on the known interval is simply called the known interval.

If the chart 90 includes three or more markers 92 as with the chart 90A and the chart 90B, measurement of the interval of the markers 92 is not required to be performed on all pairs of markers 92. That is, the pair or pairs of markers 92 used to measure the interval between markers 92 may be appropriately selected. The two markers 92 used to measure the interval of the markers 92 are selected based on the positions of the markers 92, for example.

The marker 92 having a high image height (i.e., the marker 92 apart from the optical axis) is more affected by the distortion than the marker 92 having a low image height (i.e., the marker 92 near to the optical axis). Accordingly, the markers 92 used to measure the interval may be selected based on the image height of the markers 92. Preferably, the markers 92 having relatively low image heights are selected.

The marker 92 having a large depth (i.e., the marker 92 apart from the stereo camera 20) tends to have an error of the measurement position, in comparison with the marker 92 having a small depth (i.e., the marker 92 near to the stereo camera 20). Accordingly, it is preferable that the depths of each marker 92 or an appropriate number of markers 92 be calculated, and the markers 92 used to measure the interval be selected based on the calculated depths of the markers 92. Preferably, the markers 92 having a relatively small depth are selected.

The error of every combination of two markers 92 may be calculated, and the mean error, the maximum error, and the like may be used. For example, two markers 92 having low image heights may be selected, and the error may be used.

[Optical Axis Correcting Processor]

The optical axis correcting processor 44 uses the measurement result of the measurement processor 42 to perform a process of correcting the positions of the optical axes 28*l* and 28*r* of the left and right optical systems 22*l* and 22*r* of the left and right imaging systems 20*l* and 20*r* of the stereo camera 20.

This correcting process is a process of performing a process corresponding to moving the positions of the optical axes 28*l* and 28*r* of the left and right optical systems 22*l* and 22*r* in the perpendicular and lateral directions on the imaging surfaces of the left and right imaging areas 24*l* and 24*r* of the stereo camera 20 to thereby calculate the deviation amount in the perpendicular and lateral directions, and adopting the amount of canceling the deviation amount as the correction amount for the positions of the optical axes 28*l* and 28*r*.

The process corresponding to moving the optical axis position is a process of changing the parameter pertaining to the optical axis position. In the following description, the description that the optical axis position is moved and the optical axis position is changed means that the parameter is changed as described above.

The optical axis correcting processor 44 changes the positions of the optical axes 28*l* and 28*r*, while retrieving the positions of the optical axes 28*l* and 28*r* where the measurement error of the interval of a pair or pairs of markers 92 (the difference between the actual interval (known interval) of the markers 92 and the measurement result of the interval of the markers 92 by the measurement processor 42) is minimized, thereby determining the correction amounts of the optical axes 28*l* and 28*r*.

The search of the optical axis position is, for example, performed as follows. The optical axis correcting processor 44 reads the known interval of the markers 92, and the measurement result by the measurement processor 42, from the memory 46, and calculates the measurement error. The optical axis correcting processor 44 changes the parameters pertaining to the positions of the optical axes 28*l* and 28*r*, and causes the memory 46 to store the changed parameters as the correction amount. The measurement processor 42 reads the stereo image, the calibration parameters, and the correction amount from the memory 46, measures the interval of the markers 92 using them, and causes the memory 46 to store the measurement result. The optical axis correcting processor 44 and the measurement processor 42 repetitively changes the parameters pertaining to the optical axis positions and measures the interval of the markers 92 using the changed parameters. The optical axis correcting processor 44 obtains the parameters pertaining to the positions of the optical axes 28*l* and 28*r* that minimize the measurement error, based on the measurement error calculated using the measurement result by the measurement processor 42 every time the parameters pertaining to the optical axis positions are changed. The optical axis correcting processor 44 causes the memory 46 to store the thus obtained parameters pertaining to the positions of the optical axes 28*l* and 28*r* as the correction amounts.

Figure 13:
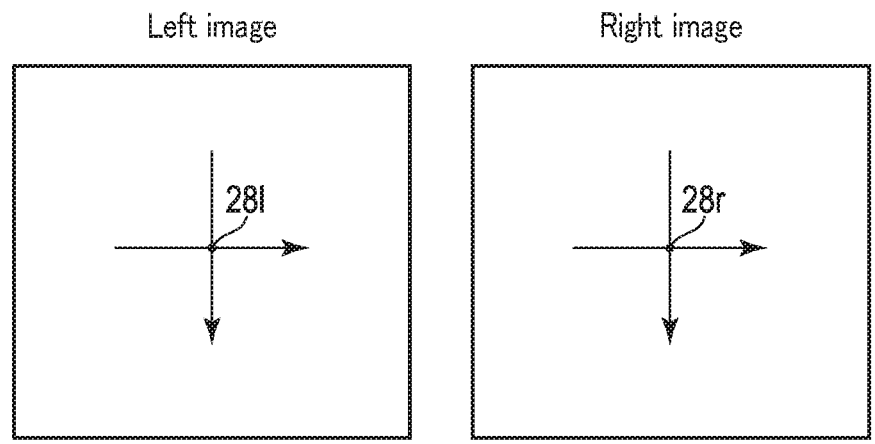
FIG. 13 schematically shows an optical axis correcting process performed by an optical axis correcting processor.

FIG. 13 schematically shows the optical axis correcting process performed by the optical axis correcting processor 44. FIG. 13 depicts situations where the position of the optical axis 28*l* is changed by two parameters in the perpendicular direction and the lateral direction for the left image, and the position of the optical axis 28*r* is changed by two parameters in the perpendicular direction and the lateral direction for the right image. That is, the optical axis correcting process is performed by the four parameters.

The search of the positions of the optical axes 28*l* and 28*r* that minimize the measurement error may adopt any of the following two schemes.

{Optical axis correction scheme (1)} The optical axis correction scheme (1) is a scheme of simultaneously performing correction in the perpendicular direction and correction in the lateral direction. In other words, the scheme simultaneously corrects the four parameters.

{Optical axis correction scheme (2)} The optical axis correction scheme (2) is a scheme of performing correction in the perpendicular direction and subsequently performing correction in the lateral direction. In other words, the scheme first corrects the two parameters, and subsequently corrects the remaining two parameters.

{Optical Axis Correction Scheme (1)-1}

Figure 14:
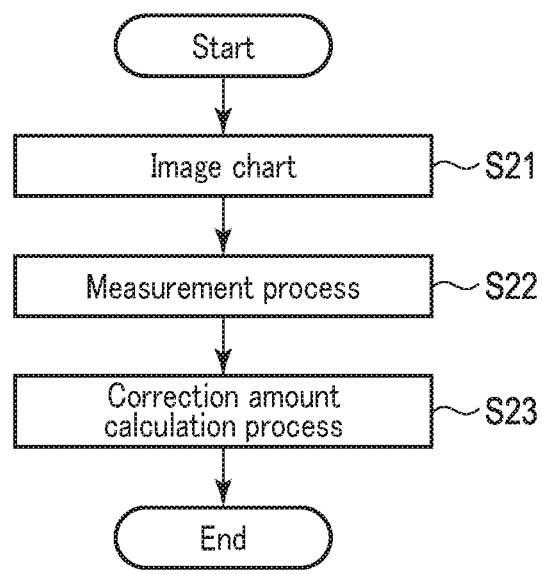
FIG. 14 shows a flow of a calibration process that includes an optical axis correcting process of simultaneously performing correction in the perpendicular direction and correction in the lateral direction.

The optical axis correction scheme (1) is a scheme of simultaneously performing correction in the perpendicular direction and correction in the lateral direction. FIG. 14 shows a flow of the calibration process that includes the optical axis correcting process according to the optical axis correction scheme (1).

<Step S21>

In step S21, the chart is imaged. The controller 48 outputs an instruction of imaging the chart 90 to the display 70. After the stereo camera 20 images the chart 90, the controller 48 obtains the stereo image from the stereo camera 20 and causes the memory 46 to store the image.

<Step S22>

In step S22, the measurement process is performed. The controller 48 obtains the calibration parameters from the storage device 80, and causes the memory 46 to store the obtained calibration parameters. The controller 48 outputs, on the display 70, an instruction of inputting the known interval of the markers 92 in the chart 90. Subsequently, the controller 48 obtains the known interval of the markers 92 from the input device 60, and causes the memory 46 to store the interval. Subsequently, the measurement processor 42 reads the stereo image, the calibration parameters, and the correction amount (zero in the initial state) from the memory 46, measures the interval of the markers 92 using them, and causes the memory 46 to store the measurement result.

<Step S23>

In step S23, the optical axis correcting processor 44 cooperates with the measurement processor 42 to perform the correction amount calculation process. The optical axis correcting processor 44 reads the known interval of the markers 92, and the measurement result by the measurement processor 42, from the memory 46, and calculates the measurement error. The optical axis correcting processor 44 changes the parameters pertaining to the optical axis positions, and causes the memory 46 to store the changed parameters as the correction amount. In response thereto, the measurement processor 42 measures the interval of the markers 92 using the stereo image, the calibration parameters, and the correction amount (parameters pertaining to the changed optical axis positions), and causes the memory 46 to store the measurement result. The optical axis correcting processor 44 and the measurement processor 42 repetitively perform the series of processes. The optical axis correcting processor 44 obtains the parameters pertaining to the optical axis positions that minimize the measurement error, based on the measurement error calculated using the measurement result by the measurement processor 42 every time the parameters pertaining to the optical axis positions are changed.

The optical axis correction scheme (1) is a scheme of simultaneously correcting the four parameters. Accordingly, the optical axis correcting processor 44 performs a process corresponding to changing the position of the optical axis 28l of the left optical system 22l with respect to both the perpendicular direction and the lateral direction for the left image, and changing the position of the optical axis 28r of the right optical system 22r in the perpendicular direction and the lateral direction for the right image, during changing the parameters pertaining to the optical axis positions in the correction amount calculation process in step S22. The correction amount calculation process can be performed using the steepest descent method with the measurement error being adopted as the objective function, or the exhaustive search method. Note that the exhaustive search method has a possibility of having an enormous computational cost.

{Optical Axis Correction Scheme (1)-2}

Figure 15:
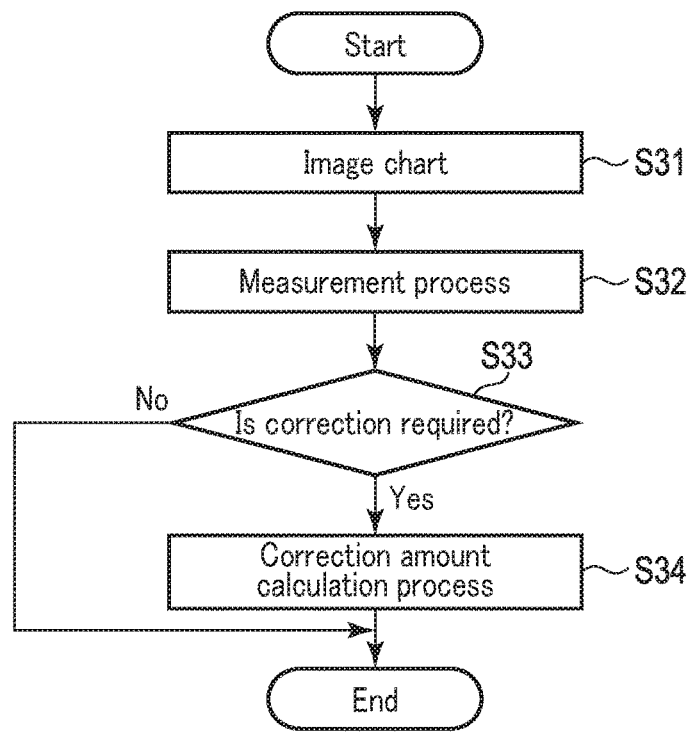
FIG. 15 shows another flow of the calibration process that includes an optical axis correcting process of simultaneously performing correction in the perpendicular direction and correction in the lateral direction.

FIG. 15 shows another flow of the calibration that includes an optical axis correcting process according to the optical axis correction scheme (1) that simultaneously performs correction in the perpendicular direction and correction in the lateral direction.

<Step S31>

In step S31, the chart is imaged. The chart is imaged as described above.

<Step S32>

In step S32, the measurement process is performed. The measurement process is as described above.

<Step S33>

In step S33, the optical axis correcting processor 44 determines the necessity of correction, that is, determines whether to require correction or not, based on the measurement result by the measurement process in step S31. Accordingly, the optical axis correcting processor 44 compares the measurement error (the difference between the known interval of the markers 92 and the measurement result of the interval of the markers 92 by the measurement processor 42) with a predetermined threshold. If the measurement error is equal to or smaller than the threshold as a result of the comparison, the optical axis correcting processor 44 determines that the correction is not required. On the contrary, if the measurement error is larger than the threshold, the optical axis correcting processor 44 determines that the correction is required. If it is determined that the correction is not required, the calibration process is finished. On the contrary, if it is determined that the correction is required, the processing transitions to step S34.

<Step S34>

In step S34, the optical axis correcting processor 44 cooperates with the measurement processor 42 to perform the correction amount calculation process. The correction amount calculation process is as described above.

{Optical Axis Correction Scheme (2)-1}

Figure 16:
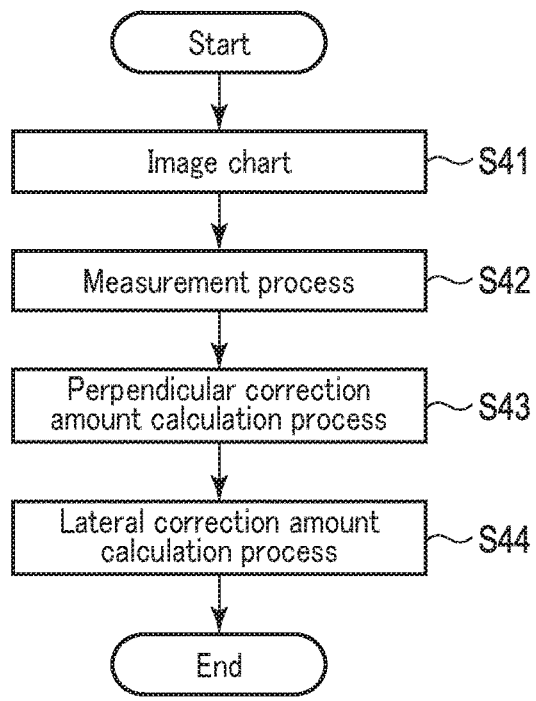
FIG. 16 shows a flow of a calibration process that includes an optical axis correcting process of performing correction in the perpendicular direction and subsequently performing correction in the lateral direction.

The optical axis correction scheme (2) is a scheme of performing correction in the perpendicular direction and subsequently performing correction in the lateral direction. FIG. 16 shows a flow of the calibration process that includes the optical axis correcting process according to the optical axis correction scheme (2).

<Step S41>

In step S41, the chart is imaged. The chart is imaged as described above.

<Step S42>

In step S42, the measurement process is performed. The measurement process is as described above.

<Step S43>

In step S43, the optical axis correcting processor 44 performs the perpendicular correction amount calculation process. The perpendicular correction amount calculation process is a process of performing a process corresponding to changing the positions of the optical axes 28l and 28r of the left and right optical systems 22l and 22r in the perpendicular direction to thereby calculate the perpendicular deviation amount, and adopting the amount of canceling the deviation amount as the perpendicular correction amount for the positions of the optical axes 28l and 28r. The details of the perpendicular correction amount calculation process are described later.

<Step S44>

In step S44, the optical axis correcting processor 44 performs the lateral correction amount calculation process. The lateral correction amount calculation process is a process of performing a process corresponding to changing the positions of the optical axes 28*l* and 28*r* of the left and right optical systems 22*l* and 22*r* in the lateral direction to thereby calculate the lateral deviation amount, and adopting the amount of canceling the deviation amount as the lateral correction amount for the positions of the optical axes 28*l* and 28*r*. The details of the lateral correction amount calculation process are described later.

Figure 17:
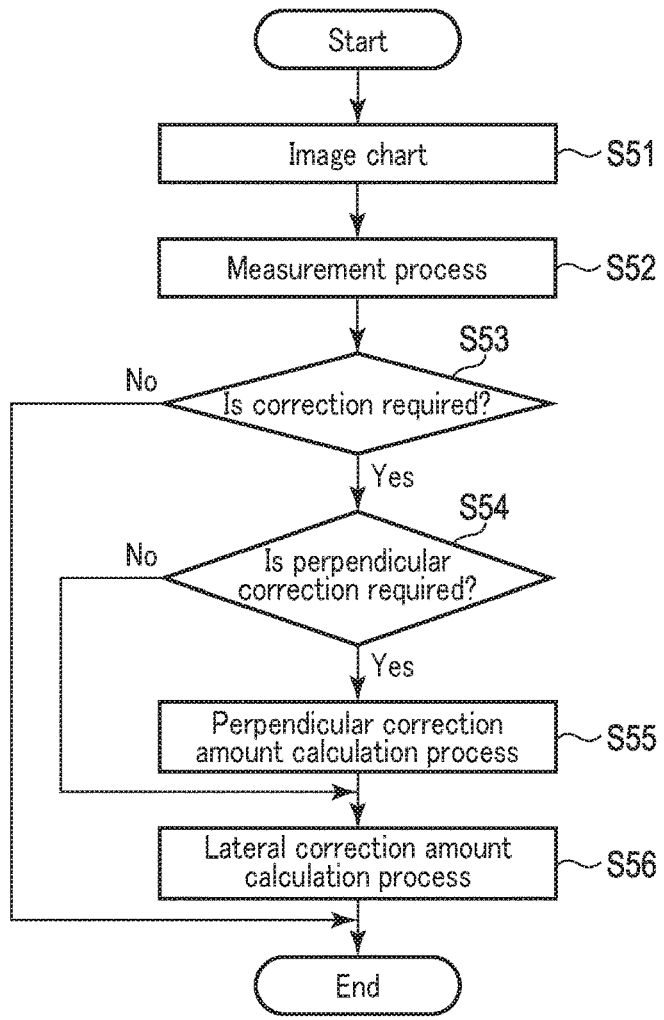
FIG. 17 shows another flow of the calibration process that includes an optical axis correcting process of performing correction in the perpendicular direction and subsequently performing correction in the lateral direction.

{Optical axis correction scheme (2)-2} FIG. 17 shows another flow of the calibration process that includes an optical axis correcting process according to the optical axis correction scheme (2) that is a scheme of performing correction in the perpendicular direction and subsequently performing correction in the lateral direction.

<Step S51>

In step S51, the chart is imaged. The chart is imaged as described above.

<Step S52>

In step S52, the measurement process is performed. The measurement process is as described above.

<Step S53>

In step S53, the optical axis correcting processor 44 determines the necessity of correction, that is, determines whether to require correction or not, based on the measurement result by the measurement process in step S31. The determination of the necessity of correction is performed based on the measurement error of the interval of the markers 92. Accordingly, the optical axis correcting processor 44 compares the measurement error (the difference between the known interval of the markers 92 and the measurement result of the interval of the markers 92 by the measurement processor 42) with a predetermined threshold. If the measurement error is equal to or smaller than the threshold as a result of the comparison, the optical axis correcting processor 44 determines that the correction is not required. On the contrary, if the measurement error is larger than the threshold, the optical axis correcting processor 44 determines that the correction is required. If it is determined that the correction is required, the processing transitions to step S54. On the contrary, if it is determined that the correction is not required, the calibration process is finished.

<Step S54>

In step S54, the optical axis correcting processor 44 determines the necessity of perpendicular correction, that is, determines whether to require perpendicular correction or not, based on the measurement result by the measurement process in step S31. The determination of the necessity of the perpendicular correction is performed based on the deviation in the perpendicular direction in coordinates of the two corresponding points for the same marker on the left and right images. Accordingly, the optical axis correcting processor 44 compares the two corresponding points of each marker 92 in the perpendicular direction. If the coordinates of the two corresponding points in the perpendicular direction coincide with each other or if the deviation in the perpendicular direction in the coordinates of the two corresponding points is equal to or smaller than the predetermined threshold as a result of the comparison, the optical axis correcting processor 44 determines that the perpendicular correction is not required. On the contrary, if the coordinates of the two corresponding points in the perpendicular direction do not coincide with each other or if the deviation in the perpendicular direction in the coordinates of the two corresponding points is larger than the threshold, it is determined that the perpendicular correction is required. If it is determined that the perpendicular correction is required, the processing transitions to step S55. On the contrary, if it is determined that the perpendicular correction is not required, the processing transitions to step S56.

<Step S55>

In step S55, the optical axis correcting processor 44 performs the perpendicular correction amount calculation process. The perpendicular correction amount calculation process is a process of performing a process corresponding to changing the positions of the optical axes 28*l* and 28*r* of the left and right optical systems 22*l* and 22*r* in the perpendicular direction to thereby calculate the perpendicular deviation amount, and adopting the amount of canceling the deviation amount as the perpendicular correction amount for the positions of the optical axes 28*l* and 28*r*. The details of the perpendicular correction amount calculation process are described later. Subsequently, the processing transitions to step S56.

<Step S56>

In step S56, the optical axis correcting processor 44 performs the lateral correction amount calculation process. The lateral correction amount calculation process is a process of performing a process corresponding to changing the positions of the optical axes 28*l* and 28*r* of the left and right optical systems 22*l* and 22*r* in the lateral direction to thereby calculate the lateral deviation amount, and adopting the amount of canceling the deviation amount as the lateral correction amount for the positions of the optical axes 28*l* and 28*r*. The details of the lateral correction amount calculation process are described later.

Figure 18:
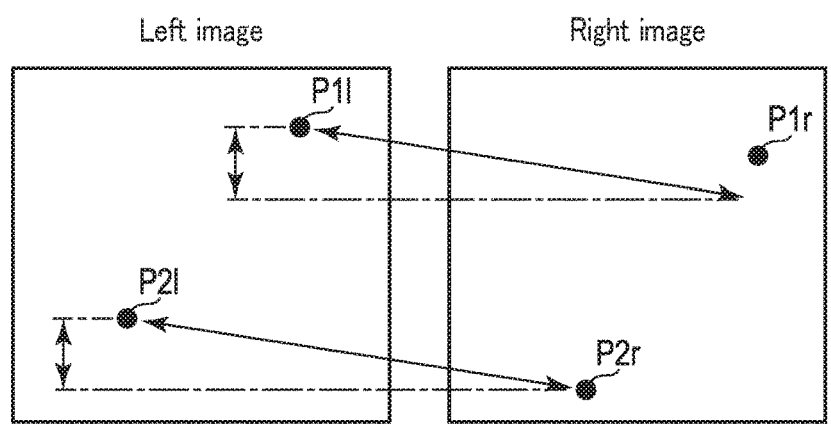
FIG. 18 schematically shows perpendicular correction amount calculation processes shown in FIG. 16 and FIG. 17.

FIG. 18 schematically shows the perpendicular correction amount calculation processes shown in FIG. 16 and FIG. 17. FIG. 18 depicts two corresponding points P1*l* and P1*r* for a marker, and two corresponding points P2*l* and P2*r* for another marker. The two corresponding points P1*l* and P1*r* are points corresponding to the identical marker on the right image and the left image, respectively. The two corresponding points P2*l* and P2*r* are points corresponding to the other identical marker on the right image and the left image, respectively. It can be considered that the corresponding points P1*l* and P1*r* and the corresponding points P2*l* and P2*r* correspond to Pl(u, v) and Pr(u', v) in FIG. 12.

Here, for the sake of convenience, the coordinate in the perpendicular direction is called the y coordinate. The y coordinates of the corresponding points P1*l* and P1*r* deviate from each other. Likewise, the y coordinates of the corresponding points P2*l* and P2*r* deviate from each other. The optical axis correcting processor 44 calculates the deviation amount of the y coordinates, that is, the perpendicular deviation amount, of the corresponding points P1*l* and P1*r* or the corresponding points P2*l* and P2*r* and causes the memory 46 to store the amount of canceling the perpendicular deviation amount as the perpendicular correction amount. It may be that the perpendicular deviation amount of the corresponding points P1*l* and P1*r* and the perpendicular deviation amount of the corresponding points P2*l* and P2*r* is calculated, the average value of the two perpendicular deviation amounts is calculated, and the amount of canceling the average value is adopted as the perpendicular correction amount.

Since the perpendicular deviation amount is obtained from the coordinates of the two corresponding points for a marker in the perpendicular direction, the perpendicular correction amount calculation process can calculate the perpendicular correction amount before the lateral correction amount.

The perpendicular deviation amount obtained from the coordinates of the two corresponding points for a marker in the perpendicular direction is a relative perpendicular deviation amount. Accordingly, the relative perpendicular correction amount can be obtained, but the absolute perpendicular correction amount cannot be calculated. However, use of three markers in the chart 90 that are arranged at known intervals allows the absolute perpendicular correction amount to be calculated. For example, a process of aligning the three markers on a line is performed using the three markers in the chart 90 arranged on a line at known intervals, thereby allowing the absolute perpendicular correction amount to be calculated.

FIG. 19 schematically shows the lateral correction amount calculation process shown in FIG. 16 and FIG. 17. FIG. 19 depicts situations where the position of the optical axis 28*l* is changed by one parameter in the lateral direction for the left image, and the position of the optical axis 28*r* is changed by one parameter in the lateral direction also for the right image. That is, the optical axis correcting process is performed by the two parameters.

FIG. 20 graphically illustrates the lateral correction amount calculation process shown in FIG. 16 and FIG. 17. Here, for the sake of convenience, the coordinate in the lateral direction is called the x coordinate, the correction amount for the x coordinate of the optical axis 28*l* of the left optical system 22*l* in the left image is denoted by Δclx, the correction amount for the x coordinate of the optical axis 28*r* of the right optical system 22*r* in the right image is denoted by the Δcrx, and the measurement error between two markers is denoted by e. The lateral correction amount calculation process is performed by calculating the correction amounts Δclx and Δcrx that minimize the measurement error e of the interval between two markers, and adopts the calculated Δclx and Δcrx respectively as the correction amounts of the optical axes 28*l* and 28*r* of the left and right optical systems 22*l* and 22*r* in the lateral direction.

Δclx and Δcrx can be calculated using the exhaustive search, the steepest descent method, or the like.

However, it is known that an appropriate parallax (relative optical axis position) minimizes the measurement error e in the stereo measurement. By performing two steps of a process (1) and a process (2) described below, the correction amount of achieving the minimum error $e_0$ is effectively obtained.

Hereinafter, the process (1) and the process (2) are described with reference to FIG. 21 and FIG. 22. The process (1) is a process of determining the relative correction amount. The process (2) is a process of determining the absolute correction amount.

{(1) Determine Relative Correction Amount}

Figure 21:
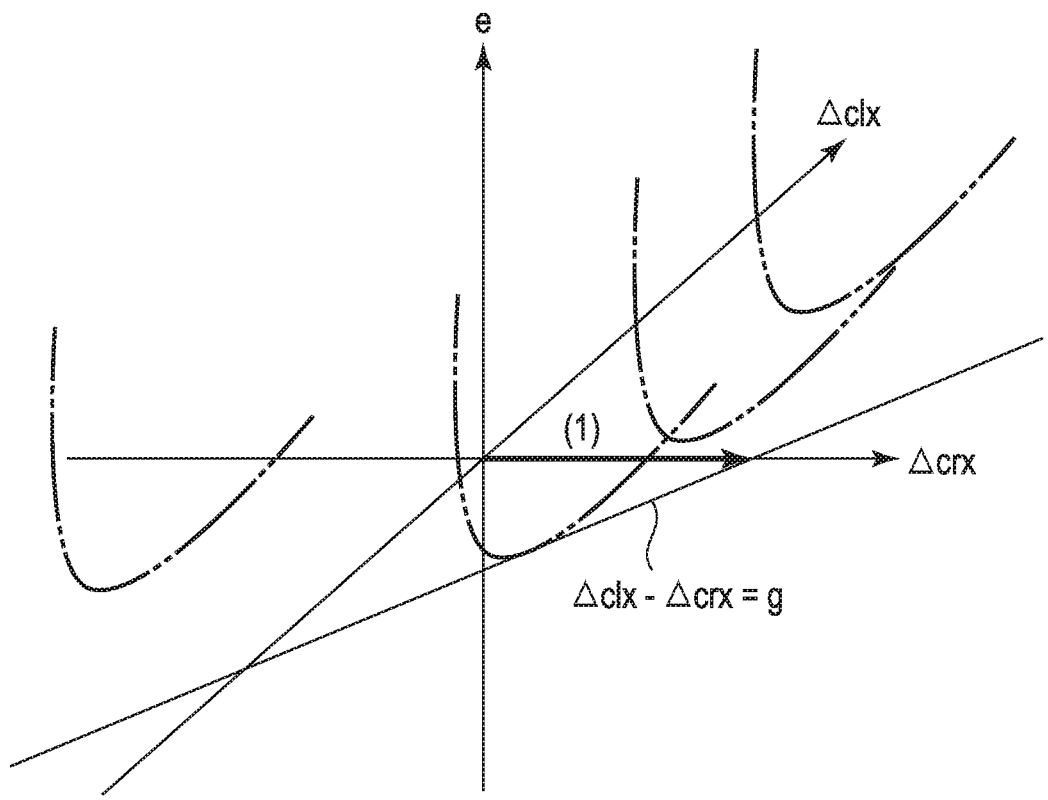
FIG. 21 graphically illustrates a process of determining a relative correction amount in the lateral correction amount calculation processes shown in FIG. 16 and FIG. 17.

FIG. 21 graphically illustrates the process of determining the relative correction amount. The x coordinate of the position of one of the optical axes 28*l* and 28*r* of the left and right optical systems 22*l* and 22*r* is changed, and the position of minimizing the measurement error e is searched. This corresponds to obtaining an intercept g where Δclx−Δcrx=g as indicated by an arrow (1) in FIG. 21.

{(2) Determine Absolute Correction Amount}

Figure 22:
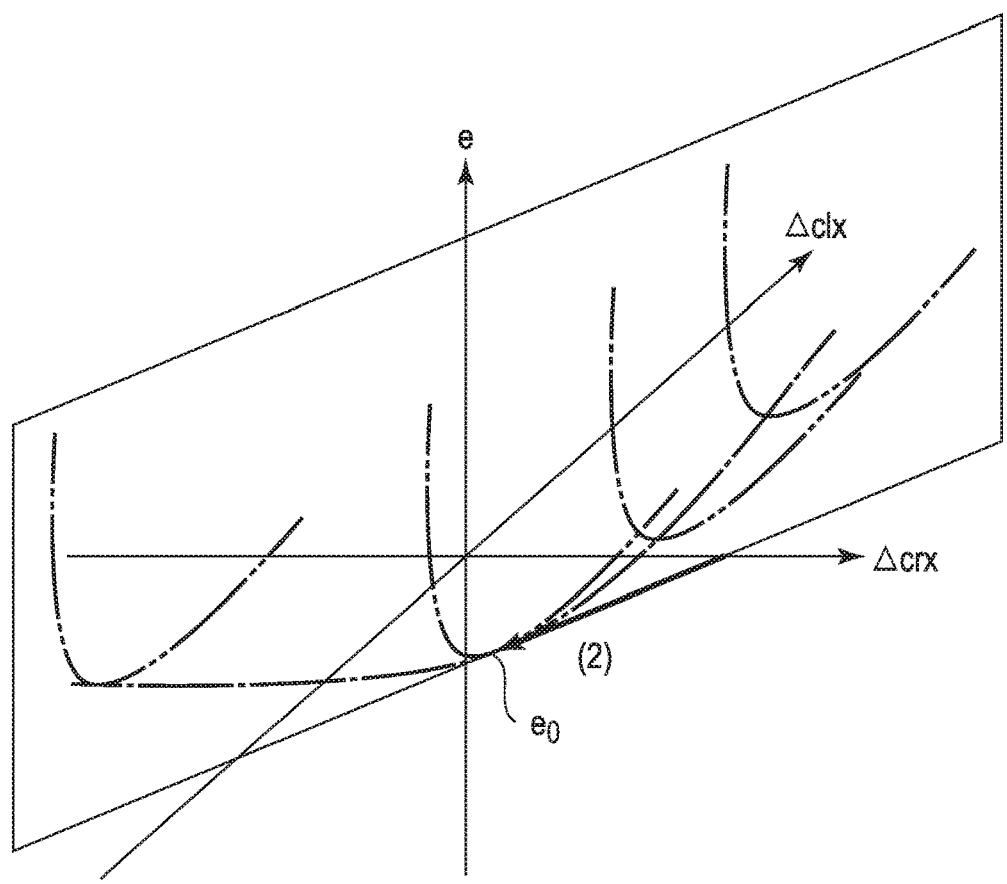
FIG. 22 graphically illustrates a process of determining an absolute correction amount in the lateral correction amount calculation processes shown in FIG. 16 and FIG. 17.

FIG. 22 graphically illustrates the process of determining the absolute correction amount. The relative correction amount is held constant, while the x coordinates of both the optical axes 28*l* and 28*r* of the left and right optical systems 22*l* and 22*r* are changed, thereby searching the position of minimizing the measurement error e. This corresponds to search of the position of the minimum error $e_0$ on a plane satisfying Δclx−Δcrx=g as indicated by an arrow (2) in FIG. 22.

Note that the main factor of change in measurement error e during the process (1) is the amount of parallax. The main factor of change in measurement error e during the process (2) is the error due to distortion correction. The error due to distortion correction has a smaller adverse effect than the error due to the amount of parallax.

[Cap]

Figure 23:
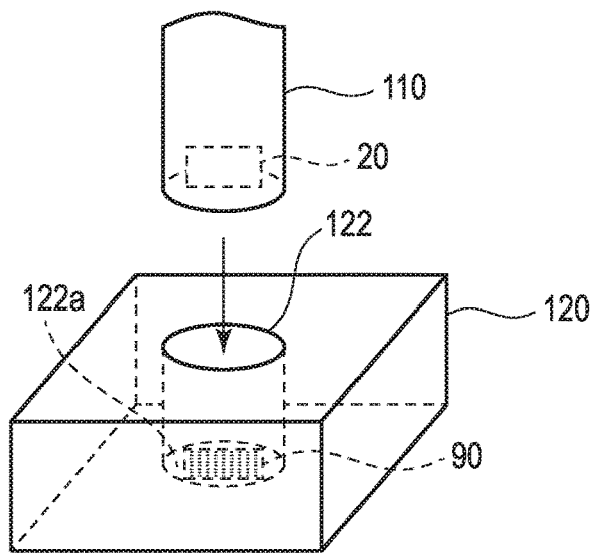
FIG. 23 shows a configuration example where the stereo camera shown in FIG. 1 is mounted on a distal end of an endoscope.

FIG. 23 shows a configuration example where the stereo camera 20 of the stereo measurement device 10 in this embodiment is mounted on a distal end of an endoscope 110. In such a configuration example, for example, the chart 90 is arranged in a cap 120 detachably attached to the distal end of the endoscope 110. The cap 120 has a concave 122 where the distal end of the endoscope 110 can be inserted substantially without any gap. The chart 90 is disposed on a bottom surface 122*a* of the concave 122 of the cap 120.

The chart 90 is imaged during calibration in a state where the distal end of the endoscope 110 is inserted into the concave 122 of the cap 120 and is brought into contact with the bottom surface 122*a*. Such a configuration stabilizes the relative orientations between the stereo camera 20 and the chart 90 during imaging and, in turn, stabilizes the correction amount.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A stereo camera calibration method, comprising:
   obtaining a stereo image generated by imaging a chart using a stereo camera, the chart at least including two markers arranged at a known interval;
   measuring the known interval, using the stereo image and a calibration parameter for the stereo camera; and
   correcting a parameter pertaining to an optical axis position and included in the calibration parameter so as to reduce a measurement error that is a difference between the known interval and a result of the measurement,
   wherein the correcting the parameter pertaining to the optical axis position comprises performing a process corresponding to moving the optical axis position in perpendicular and lateral directions on an imaging surface of the stereo camera, and
   wherein the correcting the parameter pertaining to the optical axis position further comprises first calculating a perpendicular correction amount of the optical axis position, and subsequently calculating a lateral correction amount of the optical axis position.

2. The calibration method according to claim 1, wherein the calculating the lateral correction amount comprises:
   calculating a relative lateral correction amount of minimizing the measurement error, by performing a process corresponding to laterally changing the optical axis position of one of left and right optical systems of the stereo camera, and
   calculating an absolute lateral correction amount of minimizing the measurement error, by performing a process corresponding to laterally changing the optical axis positions of both the left and right optical systems of the stereo camera while holding the relative lateral correction amount constant.

3. The calibration method according to claim 1, wherein:
   the calculating the perpendicular deviation amount comprises calculating a perpendicular deviation amount of corresponding points for an identical marker on a right image and a left image of the stereo image.

4. The calibration method according to claim 1, wherein:
the chart at least includes three markers arranged on a line at known intervals, and
the calculating the perpendicular correction amount comprises performing a process of aligning the three markers on a line.

5. The calibration method according to claim 1, further comprising:
determining whether to require to correct the parameter pertaining to the optical axis position or not, based on the measurement error.

6. The calibration method according to claim 1, wherein:
the chart includes three or more markers arranged at known intervals, and
the method further comprises selecting markers used to measure a known interval, based on an image height of each marker.

7. The calibration method according to claim 1, wherein:
the chart includes three or more markers arranged at known intervals, and
the method further comprises:
calculating a depth for each of the markers using the stereo image and the calibration parameter; and
selecting markers used to measure a known interval, based on the depth of the markers.

8. The calibration method according to claim 1, wherein:
the stereo camera is mounted on a distal end of an endoscope, and
the chart is arranged in a cap that is attachabel to and detachable from the distal end of the endoscope.

9. An image processing device for a stereo camera, comprising:
a processor and
a memory,
the processor being configured to:
output an instruction of imaging a chart using the stereo camera, the chart at least including two markers arranged at a known interval;
obtain a stereo image generated by the stereo camera, and cause the memory to store the obtained stereo image;
obtain a calibration parameter for the stereo camera, and cause the memory to store the obtained calibration parameter;
read the stereo image and the calibration parameter from the memory, measure the known interval using the read stereo image and calibration parameter, and cause the memory to store a result of the measurement; and
correct a parameter pertaining to an optical axis position and included in the calibration parameter so as to reduce a measurement error that is a difference between the known interval and a result of the measurement, and cause the memory to store an amount of the correction,
wherein the correcting the parameter pertaining to the optical axis position comprises performing a process corresponding to moving the optical axis position in perpendicular and lateral directions on an imaging surface of the stereo camera, and
wherein the correcting the parameter pertaining to the optical axis position further comprises first calculating a perpendicular correction amount of the optical axis position, and subsequently calculating a lateral correction amount of the optical axis position.

10. The image processing device according to claim 9, wherein:
the processor is configured to read the stereo image, the calibration parameter, and the amount of the correction from the memory, and perform a measurement process using the read stereo image, calibration parameter, and amount of the correction.

* * * * *